United States Patent [19]

Bardwick, III et al.

[11] 4,083,668

[45] Apr. 11, 1978

[54] NOODLE MAKING MACHINE

[76] Inventors: John Bardwick, III, 1733 Westridge, Ann Arbor, Mich. 48105; Ligor G. Fenerli, 102 S. First St., Ann Arbor, Mich. 48104

[21] Appl. No.: 681,025

[22] Filed: Apr. 28, 1976

[51] Int. Cl.² .......................................... A21C 11/24
[52] U.S. Cl. .................................. 425/194; 425/294; 425/307; 425/337
[58] Field of Search ............... 425/306, 308, 294, 337, 425/296, 335, 194, 196, 307, 314, 183, 184, 185; 264/145; 83/479, 418

[56] References Cited

U.S. PATENT DOCUMENTS

| 1,024,168 | 4/1912 | Williams | 425/337 |
|---|---|---|---|
| 1,762,268 | 6/1930 | Green | 425/337 X |
| 1,985,275 | 12/1934 | Baccellieri | 425/194 |
| 2,605,723 | 8/1952 | Rhodes | 425/337 |
| 2,746,401 | 5/1956 | Archer | 425/337 X |
| 3,792,948 | 2/1974 | Martinez | 425/337 X |

FOREIGN PATENT DOCUMENTS

| 309,466 | 7/1933 | Italy | 425/199 |
|---|---|---|---|
| 19,905 | 4/1911 | United Kingdom | 425/306 |

Primary Examiner—Francis S. Husar
Assistant Examiner—William R. Briggs
Attorney, Agent, or Firm—Barnes, Kisselle, Raisch & Choate

[57] ABSTRACT

A noodle making machine for vertical mounting in a kitchen area designed to move and shape a lump of noodle dough into a strip or flat and pass it downward through pairs of rollers having progressively narrower spacing and progressively increasing speed to narrow and stretch the dough prior to introduction into noddle cutting rollers. Roller cleaning and clearing blades, together with funnel type guides, insure downward progress of the dough. The roller speed progression preferably has an exponential relationship to insure proper progress of the dough.

4 Claims, 7 Drawing Figures

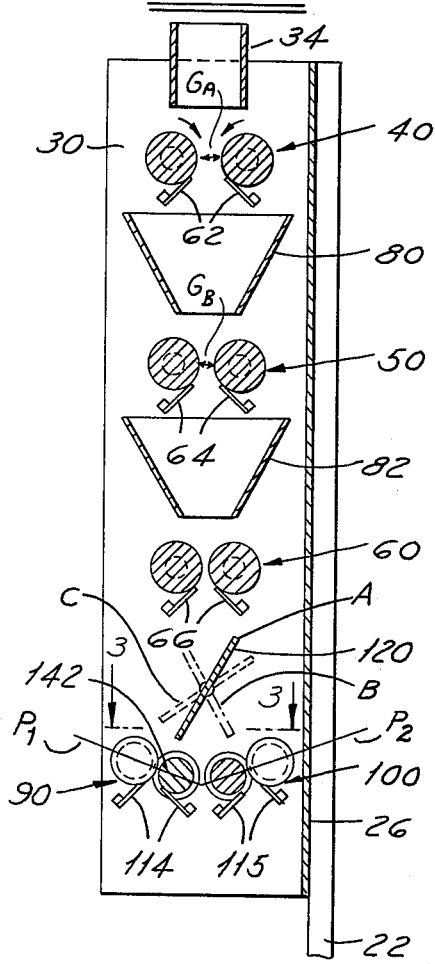
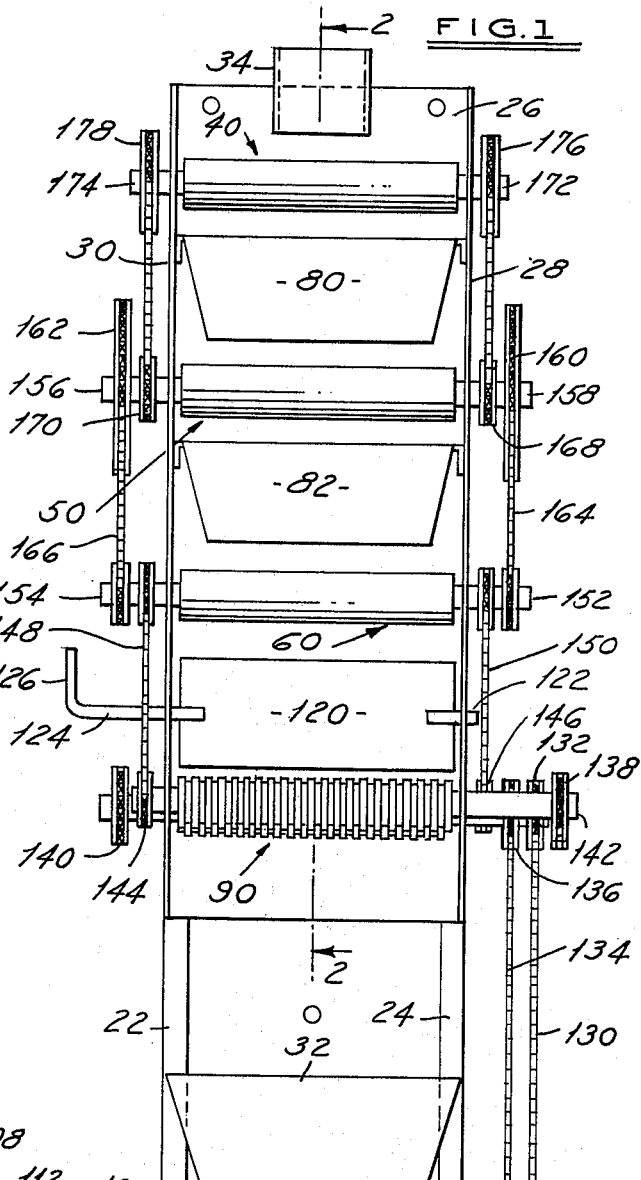
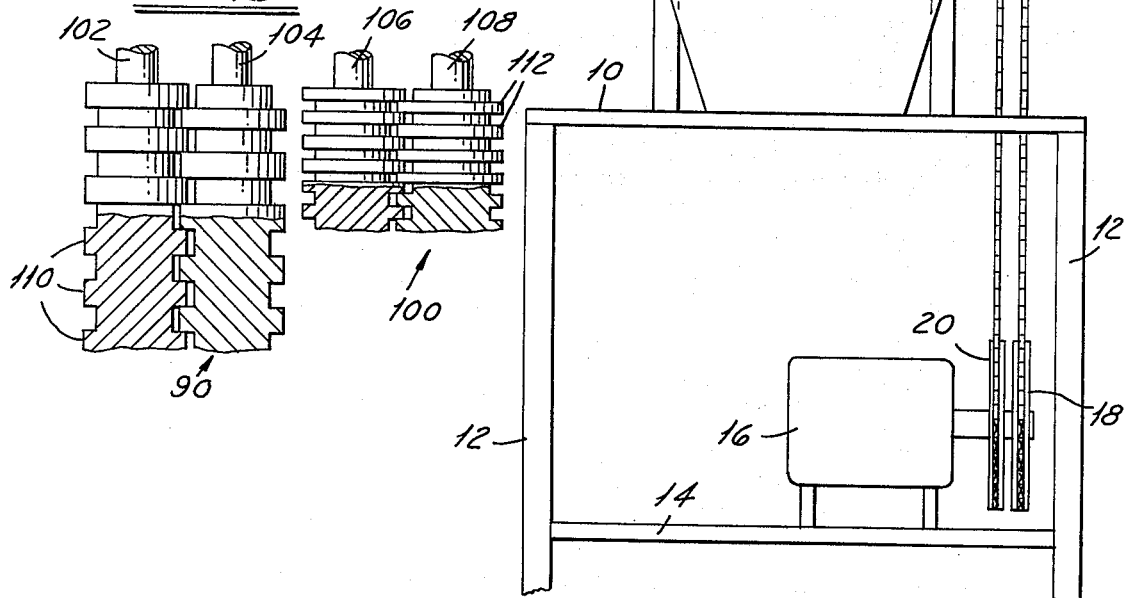

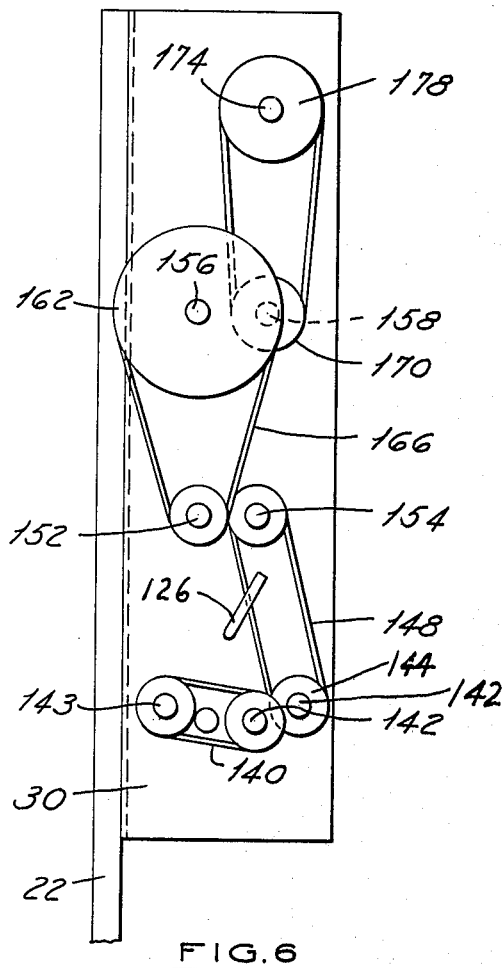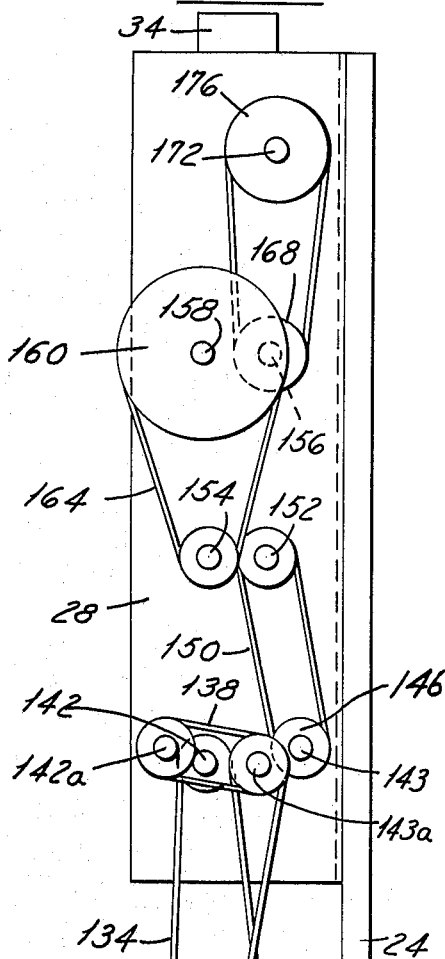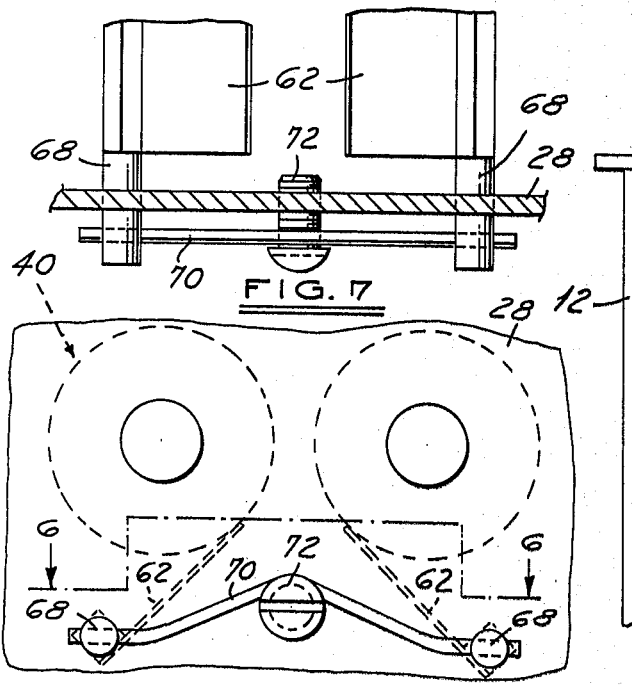

NOODLE MAKING MACHINE

This invention relates to a Noodle Making Machine and more particularly to a machine for transforming dough into noodles for spaghetti or flat pasta and other similar dishes and desserts.

Spaghetti can be most palatable if the noodles used are made immediately before serving rather than made, dried, and again heated in water. Also, freshly made noodles will cook in less than a minute as compared with about 14 minutes for dried noodles. Also, making what is commonly called puff pastry can be easily accomplished with this machine. Usually puff pastry is made this way:

1. Dough is rolled flat;
2. Coat it with butter and fold it;
3. Roll flat and repeat steps 1 and 2 several times.

With the machine, the rolling operation is fast and easy.

The present invention contemplates an improved machine for making noodles in a restaurant where spaghetti is served. The machine is of such a character that it may be mounted in a vertical position on a wall or post adjacent a cooking area. In some restaurants having what is often called an "open kitchen" area, the machine can be mounted in a place where customers can see it operate since there is a certain fascination which occurs in watching the lump of dough being transformed into fine, discrete ribbons. The machine may also be used for making flat or very thin dough sheets for use in lasagna, ravioli and puff pastry.

Since the machine is under observation in this way, it is desirable that it operate in a manner without the need of attention and with a minimal amount of handling of the material by the operator.

Therefore, it is an object of the invention to provide a machine which is automatic once the progression is initiated and which has self-cleaning rolls.

It is a further object to provide a machine which stretches the dough as it progresses into the machine.

Another object is the provision of multiple cutter roll sets which can be readily switched into the progression to produce narrow spaghetti noodles or broader noodle strands as desired.

Another object is the provision of a movable guide plate which causes the dough strip to exit from the machine prior to the multiple cutters. The thin wide dough strip can then be used for production of lasagna, ravioli, or puff pastry.

Another object of the invention has to do with the open construction which makes it possible readily to clean all of the working parts.

Other objects and features of the invention relating to details of construction and operation will be apparent in the following description and claims in which the principles of the invention are set forth, together with the best mode presently contemplated for the practice of the invention.

Drawings accompany the disclosure and the various views thereof may be briefly described as:

FIG. 1, a front view of the machine in assembled condition.

FIG. 2, a sectional view on line 2—2 of FIG. 1.

FIG. 3, a top partial view of the cutting rollers.

FIG. 4, a view of the right side of the machine as viewed in FIG. 1.

FIG. 5, a view of the left side of the machine as viewed in FIG. 1.

FIG. 6, a top view of the mounting of cleaning scrapers.

FIG. 7, an end view of the scraper mount.

Referring to FIG. 1, a support surface 10 is mounted on suitable legs 12 which form a frame which has a bottom plate 14 which carries a drive motor 16 with double sprockets 18 and 20. Rising vertically from the base frame are vertical stanchions 22 and 24 which are connected by a back plate 26. Two forwardly extending parallel plates 28 and 30 are mounted on the stanchions and back plate to extend forwardly over the work surface 10. A receptacle 32 is supported in front of the stanchions 24 on the surface 10. At the top of the described assembly is a dough feed chute 34 positioned to receive dough which is either hand fed or machine fed.

The stanchions 22, 24 or the back plate 26 can be secured to a post or wall in the kitchen area to avoid use of valuable table space.

Three pairs of feed rollers 40, 50 and 60 are supported and mounted for rotation on the side plates 28 and 30. Each roller is mounted on a shaft which rotates in a suitable bearing opening in the side plates. It will be noted, in viewing FIG. 2, that the rollers 40, 50 and 60 progressively decrease in their spacing so that the space between them is widest at the top set and relatively narrow at the bottom set. It will also be noted that scraper plates 62, 64 and 66 are mounted to bear against a lower quadrant of each roll on the inside to prevent descending dough from wrapping around the rollers rather than progressing downwardly. The plates also keep the dough rollers clean. The plates 62, for example, are shown in FIGS. 6 and 7 mounted on rods 68 which in turn are spring loaded by a torsion type spring 70 mounted on a screw 72. Thus, the plates bear resiliently against the surfaces of the drive rollers.

An elongate funnel type box 80 is mounted directly below the rollers 40 and a similar box 82 is mounted below the rollers 50 to guide the downwardly traveling dough into the next feed rollers. These boxes are suitably bracketed to the side plates 28 and 30. Between the plates 28 and 30 at the bottom of the unit directly below the rollers 60 are two pairs of cutter rollers 90 and 100. Each roller is mounted on a suitable shaft 102, 104, 106 and 108 (FIG. 3), these shafts bearing in the side plates and being driven in a manner to be later described.

It will be noted that the rollers 90 have spaced lands 110 which intermesh and the rollers 100 have lands 112 also intermeshing. The space (axial dimension) between the lands of the rollers 90 is much wider in the rollers 90 than in the rollers 100. As an example of a suitable dimension, the narrow rollers can have a space between the lands of 0.082 inch with a land or blade width of 0.078. The depth of the groove of the rollers is about ⅛ inch. In the broader rollers the space between the lands is about 0.0252 inch and the lands are about 0.248 inch in width. The depth is the same, about ⅛ inch. Below the rollers 90 and 100 are scrapers 114 and 115 mounted in a similar manner to the scrapers 62. The scrapers in contact with rollers 90 and 100, however, are different in that the contacting edges are serrated to provide projections which fit into the grooves of the rollers to insure that they are cleaned as the rollers rotate.

Between the roller set 60 and the grooved rollers is a guide plate 120 which is mounted between the side plates 28 and 30 for movement to three different angled positions. In the full line sectional view A of FIG. 2, the plate 120 guides the descending dough to the cleavage between the rollers 90. In the dot-dash line position B, the plate will guide the dough to the cleavage between the rollers 100. In a third position, C, the plate guides the dough strip out the front of the machine. In this last position, the dough egresses in a flat condition and may be used for cutting into pieces for lasagna or ravioli. A small rod 122 mounts the right-hand end of the plate 120 and an L-shaped rod 124 mounts the other end of the plate and provides a control handle 126.

We take up now the drive of the various rollers. The rollers of each set rotate in opposite directions, the left-hand roller as viewed in FIG. 2 rotating in a clockwise direction and the right-hand rollers rotating in a counterclockwise direction. The drive is accomplished from the sprockets 18 and 20 driven by the motor 16. The sprocket 18, through a chain 130, drives a sprocket 132 on a shaft of one of the rollers of the pair 100. The chain 134 drives a sprocket 136 on an opposed roller of the other pair 90. The chains 130 and 134 are arranged so that one drives in the direction of the motor rotation and the other drives in the opposite direction because the chain 130 is assembled in a figure eight configuration.

The other rollers of the pairs 90 and 100 are driven by short chains 138 and 140 operating on suitable sprockets on the ends of the roller shafts, the result being that the right-hand rollers (FIG. 2) of the pairs 90 and 100 are rotating in a counterclockwise direction and the left-hand rollers are rotated in a clockwise direction. Shafts 142, 142a and 143, 143a mount the rollers of pairs 90 and 100, and the ends of shafts 142 and 143 carry, respectively, sprockets 144 and 146 which, through suitable chain drives 148 and 150, drive the rollers of the set 60 in the proper directions through sprockets mounted on shafts 154 and 152.

With respect to the roller set 50, these are mounted on shafts 156 and 158 and suitable sprockets 162 and 160 receive the power from chains 166 and 164 to obtain the proper directional rotation in the set 50. The top set 40 is driven by sprockets 168 and 170 on the respective shafts 156 and 158 to the top shafts 172 and 174 carrying sprockets 176 and 178. The sprockets in each case are connected by suitable chain drives.

Thus, the single motor 16, through the sprockets 18 and 20, drives the various roller sets to provide a downward feed. In addition, the various sprockets are so proportioned in diameter that the surface feed rate through the cleavage between them increases as the dough moves downwardly so that it is continuously stretched and thinned as it progresses down toward the cutting rollers 90 and 100.

As shown best in FIG. 2, the roller sets 90 and 100 are vertically disposed so that planes P1 and P2 through the axis of the rollers are respectively angled so that each is substantially perpendicular to the plane of the guide plate 120 when directed toward the roller cleavage. This insures an even feed into the rollers since the dough is approaching at an angle.

IN THE OPERATION of the device, a pre-cut piece of dough, perhaps weighing in the neighborhood of 6 ounces and having a dimension of about 1½ × 2 × 3 inches, is placed into the top feed guide 34. As previously indicated, this can be done by hand or by an automatic feed system. The top set of rollers 40 draws the dough downwardly, reducing its thickness and the scrapers 62 insure that the dough will feed down into the directional funnel 80 into the cleavage of the next set of rollers 50. Here the dough will be narrowed in one direction and widened in the other direction and will pass through the directional funnel 82 to the rollers 60. The reduction in size is also the result of an increase in speed and this similarly prevents the dough from kinking and blocking in the various passes through which it must go. After passing the roller 60, the dough may be directed by plate 120 to one of the roller sets 90 and 100 where it is cut into the proper dimensions, wide or fine, to form the desired noodles.

If the direction plate 120 is moved to position C, the flat, uncut dough may be removed at the front of the machine on a dish or board and used for other pasta forms which require a flat dough. When very thin spacing is provided for, the dough can be pressed very thin and used for making puff pastry which is done by sequential rolling, coating with butter, and re-rolling. The spacing between the first set of rollers 40 must be sufficiently wide that the portion of dough is drawn smoothly by the rollers without requiring excess force or guides from above. The spacing between the final set of rollers, of course, is determined by the thickness of the noodles required.

With respect to the speed ratios and roller spacings, it has been found that the following relationship is appropriate:

$$G_A/G_B = (V_B/V_A)^e$$

$G_A$ = the horizontal spacing between the surfaces of a first set of rollers $G_B$ = the horizontal spacing between the surfaces of a second set of rollers below the first set $V_A$ = the linear velocity of the outside diameter of the first set of rollers $V_B$ = the linear velocity of the outside diameter of the second set of rollers $e$ = exponent For example, with respect to roller sets 50 and 60, $$G_{50}/G_{60} = (V_{60}/V_{50})^{exponent}$$

In the above formula, $G_{50}$ = the spacing between rollers 50

$G_{60}$ = the spacing between rollers 60

$V_{50}$ = the linear velocity of the outside diameter of rollers 50

$V_{60}$ = the linear velocity of the outside diameter of rollers 60

The value of the exponent is preferably about 2. It has been found that for a successful operation, the range of the exponent must be between 2.2 and 1.6. Smaller values seem to cause the dough to be pulled apart between the roller pairs while larger values cause the dough to bunch up, thus jamming the machine. In an operating machine, for example, the following values have been successful:

$G_{50}$ = 0.085 inch $G_{60}$ = 0.014 inch $V_{60}$ = 3.09 in/sec $V_{50}$ = 1.06 in/sec Exponent = 1.7

These values have given the dough strip adequate tension between the roller sets 50 and 60 without tearing. The same relationships can be utilized between the roller sets 40 and 50. It has been found that the cutting process is improved by causing the cutting rollers 90 or 100 to rotate about 10 percent faster than the roller set 60. It will be appreciated that these ratios can be readily achieved by the sprocket sizes. It will be appreciated that the surface speed of each lower set of rollers must be greater than that of the sets above it. Thus, if the roller diameters are different, this must be taken into consideration in planning the sprocket diameters.

We claim:
1. A noodle making machine which comprises:
   (a) a vertical mount frame,
   (b) a plurality of sets of feed rollers each set comprising a roller on either side of, and substantially parallel to, a common vertical plane and being vertically spaced relative to each other set and mounted horizontally on said frame, said rollers of each set being spaced from each other to provide progressively narrower gaps as the sets are spaced downwardly to provide a vertical fall path for a comestible,
   (c) cutter rollers on said frame below said plurality of sets of feed rollers, said cutter rollers comprising at least one roll having a series of axially spaced lands and grooves,
   (d) driving means on said frame connected to drive said feed and cutter rollers wherein the facing surfaces of each pair at the cleavage are moving downwardly, and
   (e) said cutter rollers comprising two sets of roller pairs spaced horizontally from the vertical fall path of the feed rollers, each set being disposed to perform independently of the other and movable guide means below the lowermost feed rather set to divert descending comestible dough from the vertical fall path between said feed rollers to the cleavage between one of said sets of cutter rollers.

2. A noodle making machine as defined in claim 1 in which the axes of each set of cutter rollers lie in a plane angled to horizontal in a direction substantially perpendicular to the flow direction of dough diverted from the next above set of rollers.

3. A noodle making machine as defined in claim 1 in which the relationship of the spacing and the speed of operation of said feed rollers is defined as:

$$G_A/G_B = (V_B/V_A)^e$$

where $G$ is the spacing between the rollers and $V$ is the linear velocity of the outside diameter of the rollers and $e$ has a value between 1.6 and 2.2

4. A noodle making machine as defined in claim 3 in which the driving means drive the cutter rollers at a speed about 10% faster than the lowermost of the feed rollers.

* * * * *

UNITED STATES PATENT AND TRADEMARK OFFICE
CERTIFICATE OF CORRECTION

PATENT NO. : 4,083,668
DATED : April 11, 1978
INVENTOR(S) : John Bardwick III and Ligor G. Fenerli It is certified that error appears in the above-identified patent and that said Letters Patent are hereby corrected as shown below:

Claim 1 (Col. 6, Line 3), change "rather" to "roller".

Signed and Sealed this

*Thirtieth* Day of *January 1979*

[SEAL]

*Attest:*

RUTH C. MASON
*Attesting Officer*

DONALD W. BANNER
*Commissioner of Patents and Trademarks*